Nov. 24, 1953  P. H. RICHARDSON  2,660,264
ASSEMBLAGE FOR EXERTING A CLAMPING FORCE
Filed Nov. 1, 1950
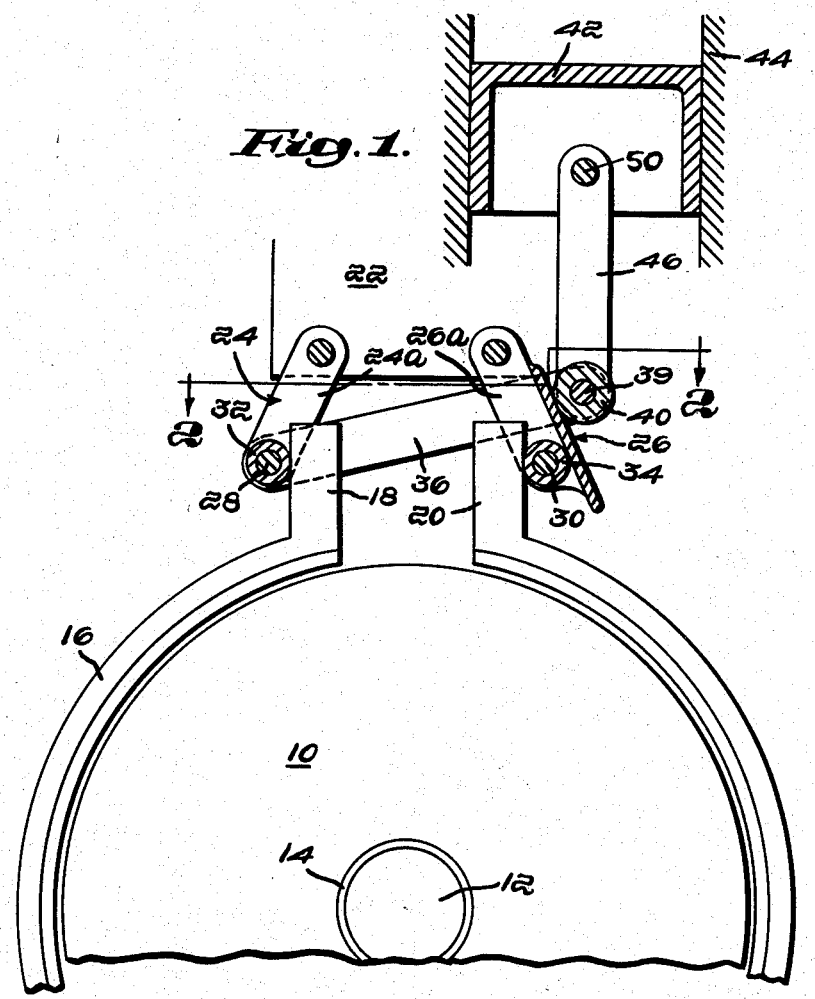
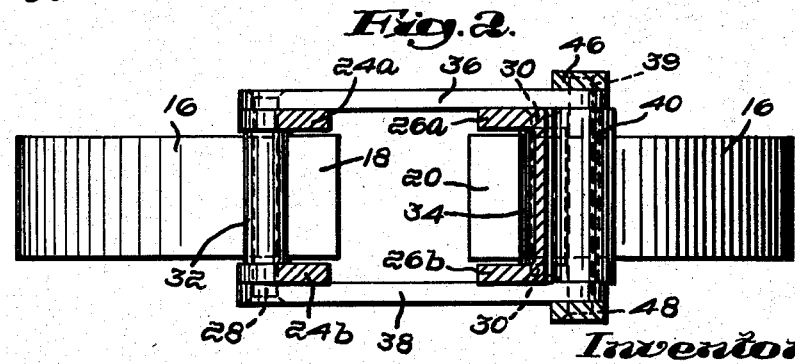
Inventor:
Paul H. Richardson
by Bryan Beecher
Attorney Patented Nov. 24, 1953

2,660,264

UNITED STATES PATENT OFFICE 2,660,264

ASSEMBLAGE FOR EXERTING A CLAMPING FORCE

Paul H. Richardson, Bridgewater, Mass., assignor to Paragon Gear Works, Inc., Taunton, Mass., a corporation of Massachusetts Application November 1, 1950, Serial No. 193,440

3 Claims. (Cl. 188—77)

My invention concerns a mechanical assemblage for applying a clamping force.

Although of general utility, the assemblage is considered particularly valuable as applied in a planetary transmission to brake the gear case housing the planetary gear set and supporting the stub shafts on which the planet gears turn.

In the case of assemblages heretofore proposed for the above purpose the force effecting tightening of the brake band about the gear casing, while acting generally along the proper line, has components in other directions. This is highly undesirable in that it results in uneven wear of the brake lining, shortening its life, and in that it puts an added load on the bearing or bushing mediate the gear case and the shafts on which it turns.

In accordance with the present invention I provide an assemblage giving a clamping force which has essentially no component in any direction but the proper direction.

In the operation of the assemblage, the force actuating the parts of which the assemblage is comprised may be applied in a direction angular with relation to the clamping force, a feature which may be taken advantage of particularly in those cases where a difference in the direction of the forces contributes to the ease of assembly of the unit including the assemblage.

My invention will be readily understood from the accompanying drawings illustrating the same in its preferred embodiment. In the drawings, Fig. 1 shows the assemblage as employed in a braking system such as previously indicated, the assemblage appearing in longitudinal section; and Fig. 2 is a section on the line 2—2 of Fig. 1.

In the drawings, the numeral 10 denotes a planetary gear set casing turning on a shaft 12 spaced from the casing by an annular bushing ring 14. Surrounding the casing is a brake band 16 provided with upstanding vertical ears 18 and 20. These ears are normally maintained separated by means of tension springs, not shown, so that the casing is free to revolve on the shaft 12.

Pivoted on a support 22 above the casing 10 are a pair of lever members 24 and 26, the axes of which in the case of the particular construction intersect at a point above their pivot points. Lever member 24, as shown, is constituted of links 24a, 24b, one at either side of the support, while lever member 26 is made as a single piece having portions straddling the support and parallel flanges 26a and 26b contiguous with such portions. Links 24a and 24b are interconnected at their lower ends through a pin 28 carrying a roller 32 engaging with the ear 18. Similarly, flanges 26a, 26b are interconnected by a pin 30 which mounts a roller 34 engaging with the ear 20.

Hingedly connected to lever member 24 at its lower end is a linkage member formed of a pair of links 36, 38, these being suitably apertured to receive the pin 28. At its opposite or raised end the linkage member carries a roller 40 turning on a pin 39 interconnecting the links 36, 38 at such end. Roller 40 bears on the back of lever member 26 which presents an essentially flat surface.

The force required to actuate the assemblage is shown as supplied by means of a hydraulically operated piston 42 reciprocal in a cylinder 44. The piston is connected to linkage 36, 38 via a linkage 46, 48 which is free to turn on either of the pins 50 and 39.

With the arrangement as described and illustrated it is believed evident that when the piston is forced downward in the cylinder 44 the rollers 32 and 34 will move toward each other to close the ears 18 and 20 and tighten the band 16 about the gear casing. The rollers 32 and 34 necessarily move through essentially the same distance since the resistances represented by the two ears of the brake band are substantially identical and since movement of either ear requires overcoming of the resistance of the opposite ear.

While the rollers as they approach each other follow a slightly arcuate path the terminal point of which is at a slightly lower level than the starting point, this is not reflected in any noticeable adverse effect either on the brake band or on the bushing due to the nature of the contact between the rollers and ears.

It will be readily apparent to those skilled in the art that the assemblage as shown may be substantially changed or modified without departing from the spirit and scope of the invention. Thus, while it is preferred to so dispose the levers 24 and 26 that their axes intersect above the pins on which the levers are pivoted, this is not essential since a system in which the axes of the levers diverge above the pins or in which the levers are crossed or pivoted on the same pin or parallel one another is perfectly operable.

Where the levers are disposed in parallel relation or with their axes diverging above their pivot points, it is necessary, of course, to form the lever corresponding to the lever 26 with an outwardly curving cam surface in order that the lever will function in the manner of the lever 26. The surface against which the roller 40 or its equivalent works may in any case be so formed as to provide a clamping force of varying intensity.

Having thus described and illustrated my invention what I claim is:

1. A clamping device comprising fixed support means, a pair of lever arms pivoted to said support means with their free ends movable toward and away from each other to clamp an article disposed therebetween, roller means mounted on each said lever arm spaced from said pivots to bear with rolling contact against said article, a linkage lever pivoted to one said lever arm and extending transversely across the second said lever arm, roller means mounted on said linkage lever to bear with rolling contact inwardly against the second said lever arm, and means for moving said linkage lever about its pivot to urge said lever arms toward each other to clamp said article.

2. A clamping device as defined in claim 1 wherein said lever arms diverge from their pivot points on said support means.

3. A clamping device as defined in claim 2 wherein said means for moving the linkage lever comprises hydraulic means.

PAUL H. RICHARDSON.

References Cited in the file of this patent

UNITED STATES PATENTS

| Number | Name | Date |
|---|---|---|
| 1,297,093 | Carr | Mar. 11, 1919 |
| 2,182,386 | Patterson | Dec. 5, 1939 |
| 2,492,816 | Rosman | Dec. 27, 1949 |
| 2,536,856 | Roeder | Jan. 2, 1951 |